(12) United States Patent
Westerkamp et al.

(10) Patent No.: US 8,294,308 B2
(45) Date of Patent: Oct. 23, 2012

(54) SYSTEM FOR PROVIDING CYCLIC MOTION

(75) Inventors: Edward Westerkamp, West Chester, OH (US); Daniel Meiser, Circleville, OH (US)

(73) Assignee: Bloemer, Meiser & Westerkamp, LLC, West Chester, OH (US)

(*) Notice: Subject to any disclaimer, the term of this patent is extended or adjusted under 35 U.S.C. 154(b) by 0 days.

(21) Appl. No.: 13/107,111

(22) Filed: May 13, 2011

(65) Prior Publication Data

US 2011/0210624 A1 Sep. 1, 2011

Related U.S. Application Data

(63) Continuation of application No. 11/877,364, filed on Oct. 23, 2007, now Pat. No. 7,958,579.

(60) Provisional application No. 60/862,914, filed on Oct. 25, 2006.

(51) Int. Cl.
*H02K 35/02* (2006.01)

(52) U.S. Cl. .............. 310/30; 310/14; 310/15

(58) Field of Classification Search .......... 310/13–15, 310/20, 23, 25, 30, 34, 36, 37
See application file for complete search history.

(56) References Cited

U.S. PATENT DOCUMENTS

| | | | |
|---|---|---|---|
| 1,261,400 A | 4/1918 | Johnson | |
| 2,869,145 A | 1/1959 | Gregory | |
| 2,916,745 A | 12/1959 | Lesk et al. | |
| 3,031,686 A | 5/1962 | Muzzey | |
| 3,040,342 A | 6/1962 | Broers | |
| 3,123,019 A | 3/1964 | Blair | |
| 3,261,033 A | 7/1966 | Martin | |
| 3,344,377 A * | 9/1967 | Clements | 335/259 |
| 3,451,072 A | 6/1969 | Cogdell | |
| 3,529,311 A | 9/1970 | Crawford | |
| 3,570,023 A | 3/1971 | Bennett | |
| 3,885,787 A | 5/1975 | Walker | |
| 4,141,095 A | 2/1979 | Adachi | |
| 4,363,980 A * | 12/1982 | Petersen | 310/15 |
| 4,553,074 A * | 11/1985 | Jacquemet | 318/130 |
| 4,616,824 A | 10/1986 | Quinlan, Jr. et al. | |
| 4,620,334 A | 11/1986 | Robinson | |
| 4,656,680 A | 4/1987 | Wilson | |
| 4,681,096 A | 7/1987 | Cuervo | |
| 4,692,673 A * | 9/1987 | DeLong | 318/132 |
| 4,813,443 A * | 3/1989 | Pounder | 137/1 |
| 4,893,366 A | 1/1990 | Rosen | |
| 4,911,499 A | 3/1990 | Meeker | |
| 4,969,451 A | 11/1990 | Totten | |
| 5,003,651 A | 4/1991 | Rosen | |
| 5,107,555 A | 4/1992 | Thrasher | |
| 5,183,457 A | 2/1993 | Gatts et al. | |
| 5,228,155 A | 7/1993 | Shultz et al. | |
| 5,249,640 A | 10/1993 | Grove | |
| 5,342,113 A | 8/1994 | Wu | |

(Continued)

*Primary Examiner* — Dang Le

(74) *Attorney, Agent, or Firm* — Wood, Herron & Evans, LLP

(57) ABSTRACT

In one embodiment, a system for providing cyclic motion includes a magnetic drive having an electrically conductive coil defining a bore and a magnetic member movable through the bore. A control provides current to the coil and selectively reverses the direction of the current to move the magnetic member through the bore. In another embodiment, the system includes a counterbalance. The counterbalance includes a biasing member for reacting against a load applied to a support, and a lever arm coupled to the biasing member for varying a preload of the biasing member. In another embodiment, the magnetic drive and the counterbalance may be incorporated into an apparatus for reciprocating a person.

3 Claims, 8 Drawing Sheets

U.S. PATENT DOCUMENTS

| | | |
|---|---|---|
| 5,617,594 A | 4/1997 | Chien |
| 5,694,655 A | 12/1997 | Shepler et al. |
| 5,708,994 A | 1/1998 | Chandran |
| 5,711,045 A | 1/1998 | Caster et al. |
| 5,845,350 A | 12/1998 | Beemiller et al. |
| 6,068,566 A | 5/2000 | Kim |
| 6,307,285 B1 * | 10/2001 | Delson et al. .................. 310/14 |
| 6,378,940 B1 | 4/2002 | Longoria et al. |
| 6,431,646 B1 | 8/2002 | Longoria |
| 6,594,840 B2 | 7/2003 | Tomas et al. |
| 6,854,530 B1 * | 2/2005 | Yiu .................................. 173/1 |
| 6,884,226 B2 | 4/2005 | Pereira |
| 6,966,082 B2 | 11/2005 | Bloemer et al. |
| 7,395,560 B2 | 7/2008 | Bloemer et al. |
| 7,503,400 B2 * | 3/2009 | Llewellyn ..................... 173/117 |
| 2002/0100116 A1 | 8/2002 | Richards |
| 2005/0000017 A1 | 1/2005 | Pereira |
| 2005/0091743 A1 | 5/2005 | Bloemer et al. |
| 2006/0031985 A1 | 2/2006 | Bloemer et al. |
| 2008/0098521 A1 | 5/2008 | Westerkamp et al. |

* cited by examiner

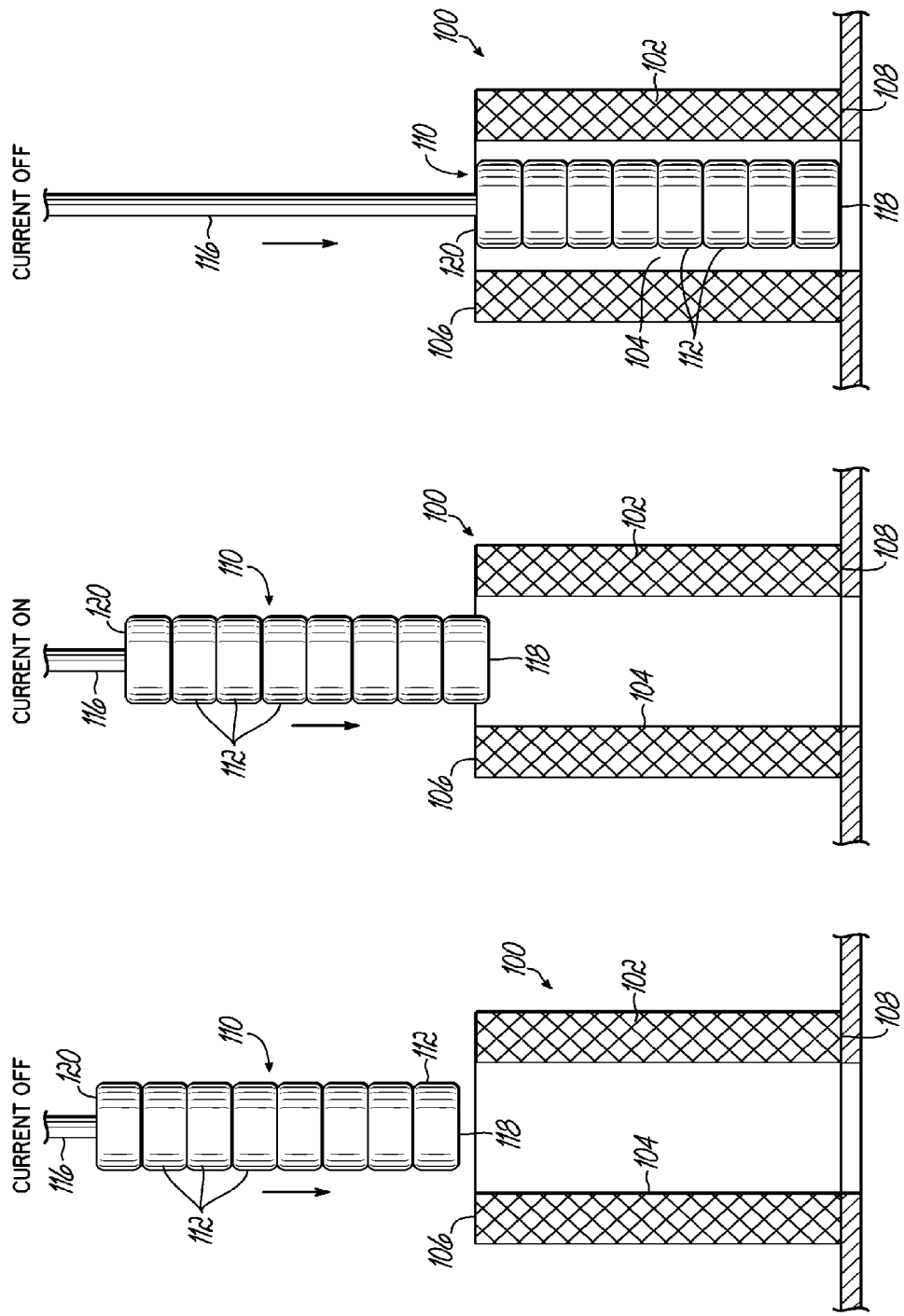

SYSTEM FOR PROVIDING CYCLIC MOTION

SYSTEM FOR PROVIDING CYCLIC MOTION

This application is a continuation of U.S. patent application Ser. No. 11/877,364, filed Oct. 23, 2007 (pending), which claims the priority of U.S. Provisional Patent Application Ser. No. 60/862,914, filed Oct. 25, 2006 (expired), the disclosures of which are hereby incorporated by reference herein in their entirety.

TECHNICAL FIELD

The present invention relates generally to machinery and mechanisms that operate in a cyclical manner, and more particularly to devices that facilitate cyclically operating such machinery and mechanisms.

BACKGROUND

Many machines and mechanisms operate in a cyclical manner. For example, rotating machinery such as turbines rotors, and reciprocating mechanisms such as paint shakers, exhibit cyclical motion. In use, these machines and mechanisms may be exposed to varying load conditions. However, many cyclically-operated machines and mechanisms are not able to accommodate varying loads while maintaining desired performance without substantial increases in power consumed. A need therefore exists for a simple, efficient system for driving cyclical machines and mechanisms, and for accommodating varying load conditions.

SUMMARY

A magnetic drive in accordance with the one aspect of the present disclosure overcomes the foregoing and other shortcomings of the prior systems for driving cyclical machines and mechanisms. In one embodiment, the magnetic drive includes an electrically conductive coil defining a bore and having first and second oppositely disposed ends. A magnetic member is movable from a first position outside the bore and adjacent the first end of the coil, through the bore to a second position outside the bore and adjacent the second end of the coil. The magnetic drive further includes a control that provides current to the coil to generate a magnetic field that interacts with the magnetic member. The control is able to reverse the direction of current through the coil and thereby act on the magnetic member as desired.

In another aspect of the present disclosure, a counterbalance mechanism is provided for offsetting a load applied to a supporting structure. In one embodiment, the counterbalance includes a biasing member that is adapted to be coupled to a load support for reacting against a load applied to the load support. The counterbalance further includes a lever arm coupled to the biasing member. The lever arm is selectively positionable relative to the biasing member to vary a preload of the biasing member. The counterbalance may further include a pivot that cooperates with the lever arm and which is selectively positionable relative to the lever arm to vary the preload of the biasing member.

In yet another aspect of the present disclosure, an apparatus for reciprocating a person includes a frame and a support platform that is constrained to move in a substantially vertical direction relative to the frame. The apparatus includes a counterbalance, as described above, with a biasing member coupled to the support platform and a lever arm coupled to the biasing member and the frame. The lever arm is selectively adjustable to vary a preload applied by the biasing member on the support platform.

While various embodiments are discussed in detail herein, it will be understood that the invention is not limited to these embodiments. On the contrary, the invention includes all alternatives, modifications and equivalents as may be included within the spirit and scope of the present disclosure.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the invention in sufficient detail to enable one of ordinary skill in the art to which the invention pertains to make and use the invention.

FIGS. 4A-4F are cross-sectional elevation views of a magnetic drive used with the apparatus of FIG. 1, depicting various positions of a magnetic member.

DETAILED DESCRIPTION

Figure 1:
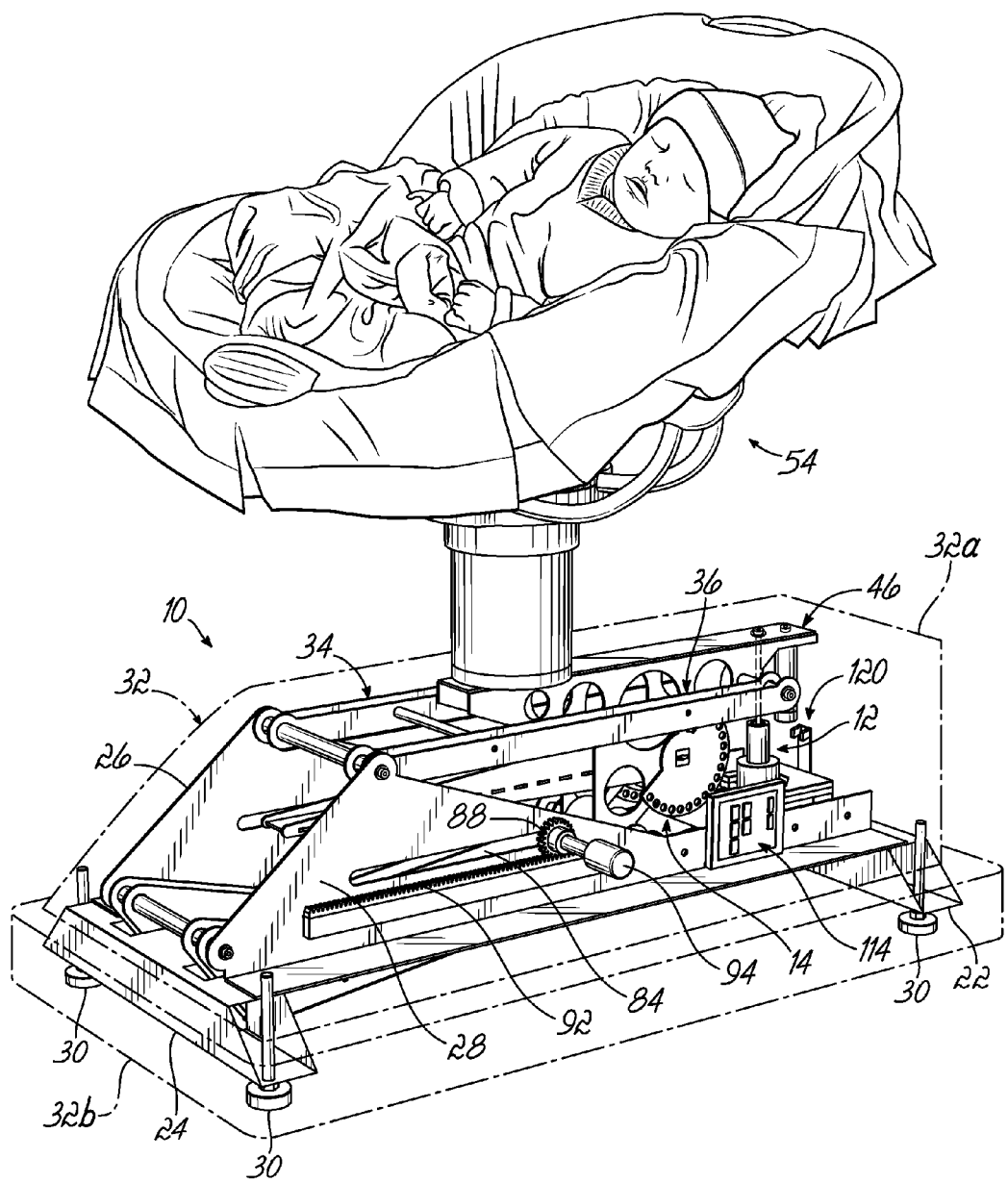
FIG. 1 is a perspective view depicting an exemplary apparatus for reciprocating an infant support, with a cover of the housing shown in phantom.

FIG. 1 depicts an exemplary cyclically operated apparatus 10 including an exemplary magnetic drive 12 and a load off-setting, or counterbalancing, device 14 in accordance with the principles of the present disclosure. In this embodiment, the apparatus 10 is configured for reciprocating an infant so as to soothe the infant in a manner similar to that described in U.S. Pat. No. 6,966,082, assigned to the assignee of the present invention and hereby incorporated by reference in its entirety. It will be understood, however, that the drive and load off-setting devices 12, 14 described herein may alternatively be used in various other mechanisms, or may be used independently of one another.

Figure 2:
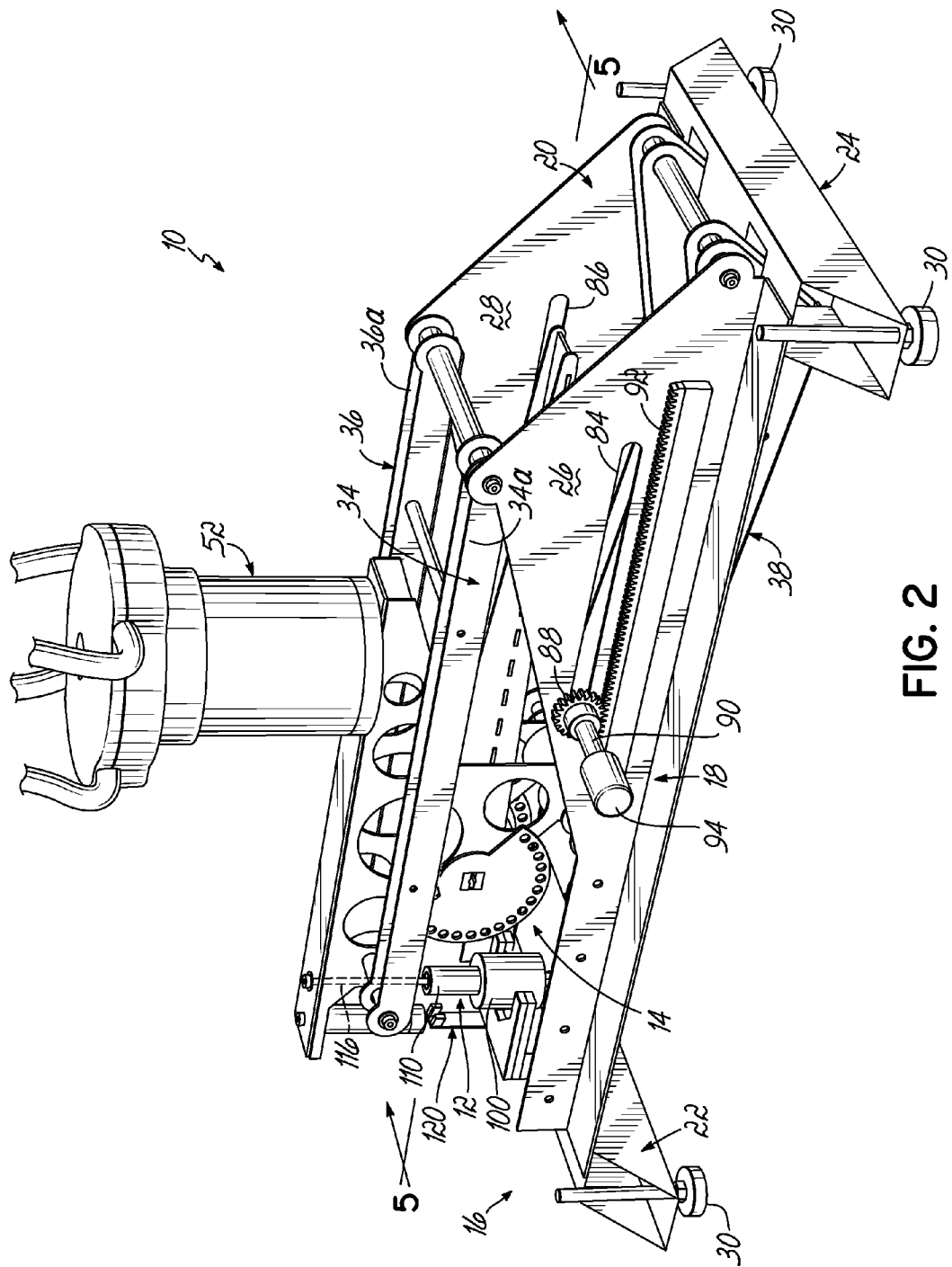
FIG. 2 is perspective view of the interior components of the apparatus of FIG. 1.
Figure 3A:
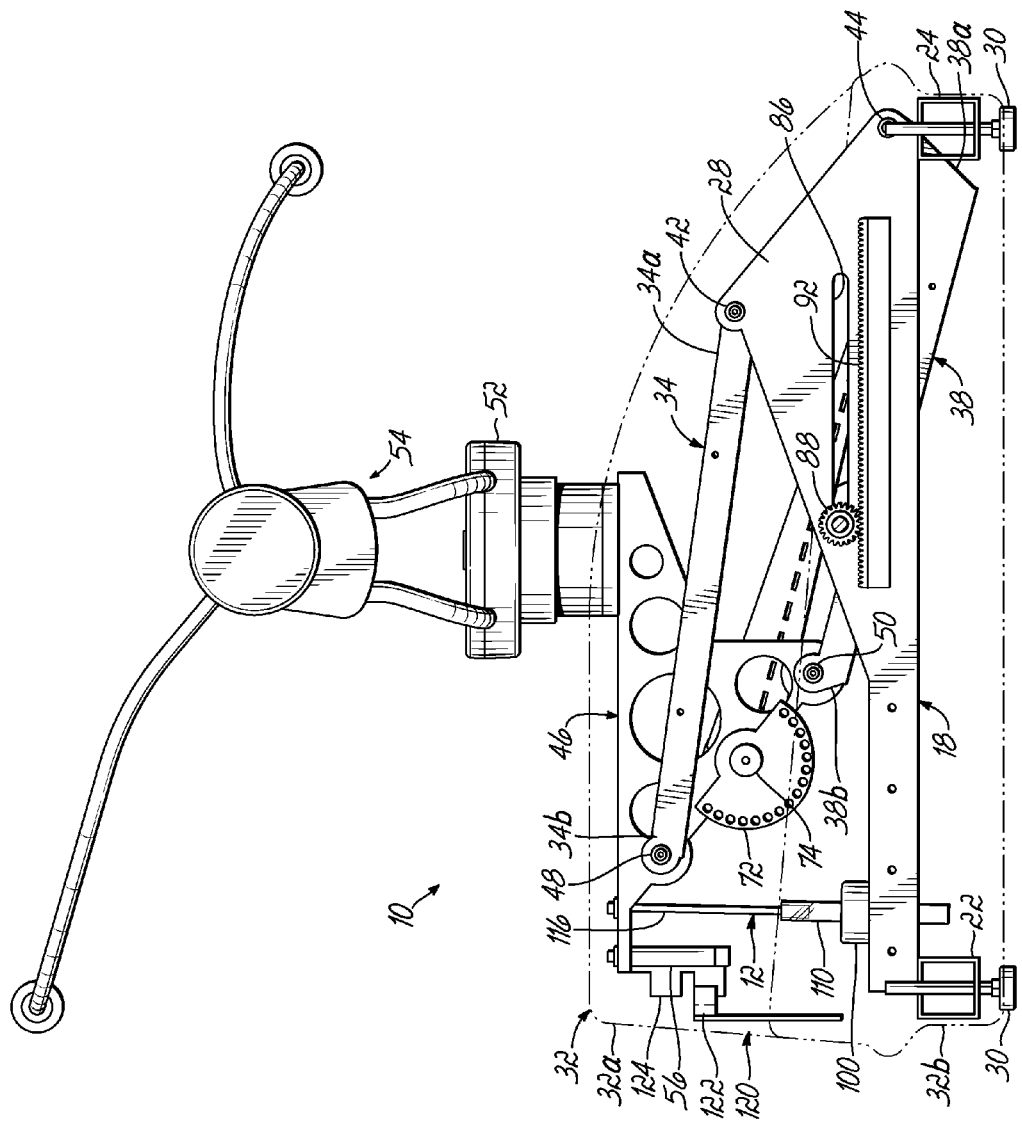
FIG. 3A is a left-side elevation view of the apparatus of FIG. 1, with the support platform depicted in a raised position.
Figure 3B:
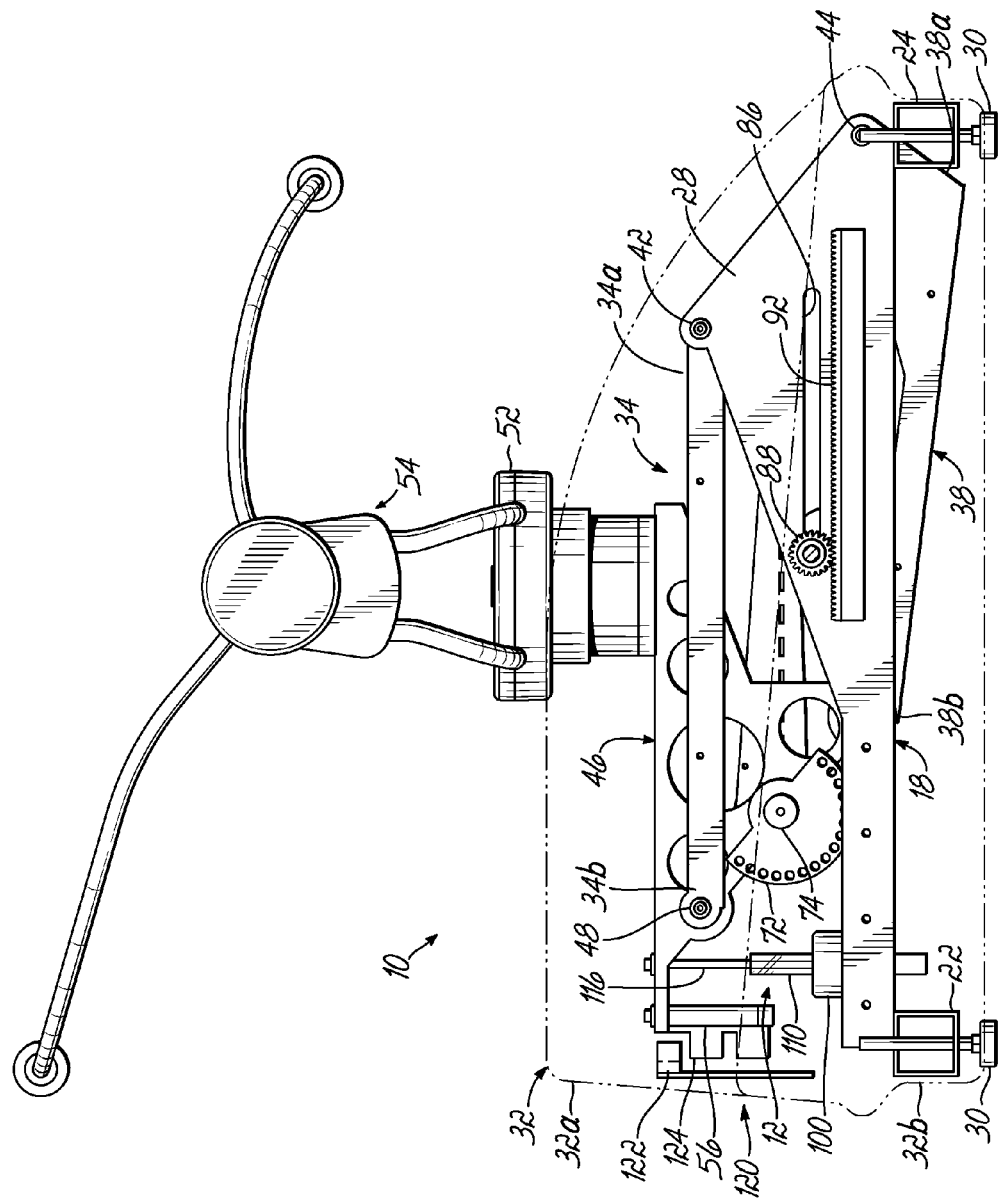
FIG. 3B is a left-side elevation view of the apparatus of FIG. 1, with the support platform depicted in a vertically centered position.
Figure 3C:
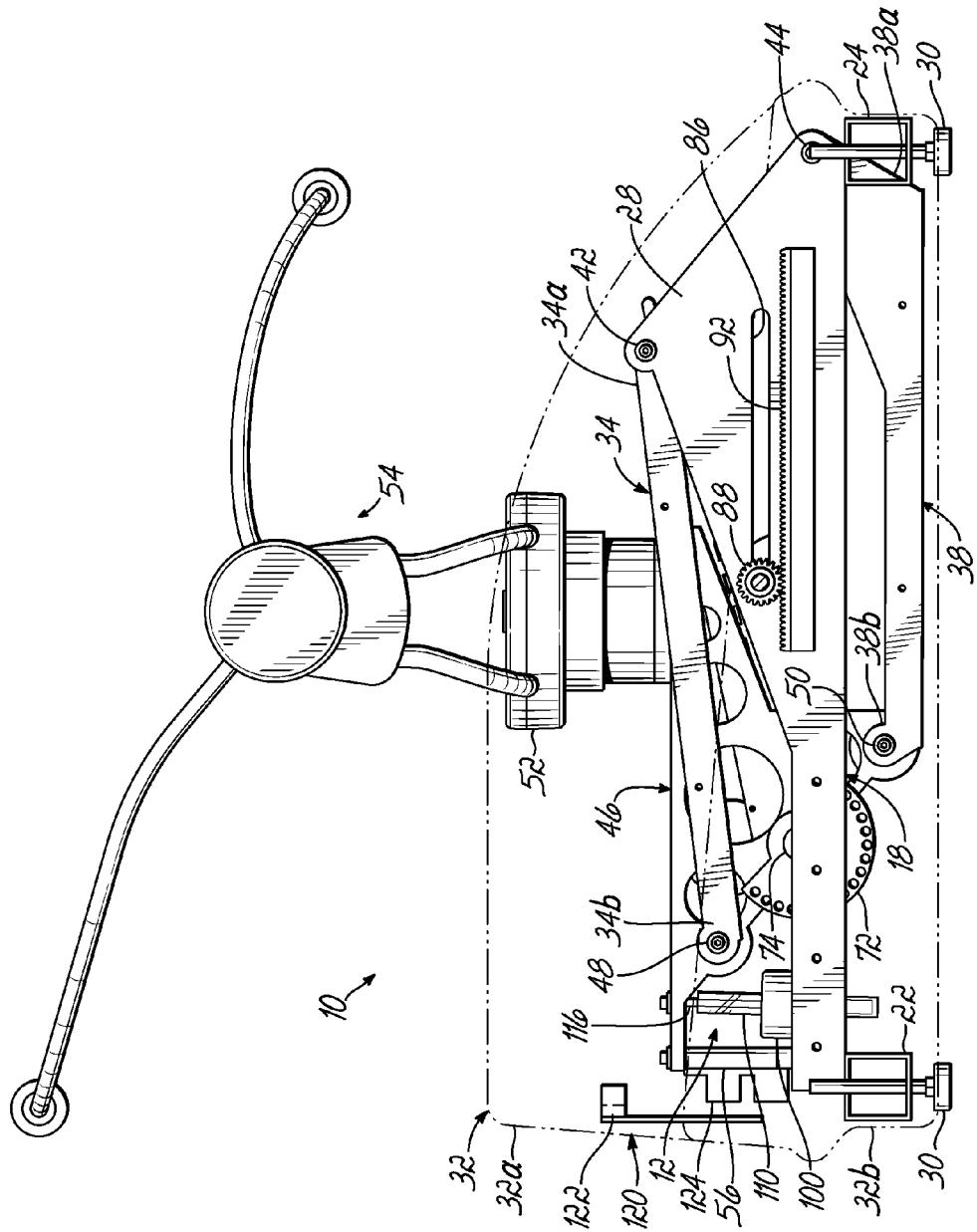
FIG. 3C is a left-side elevation view of the apparatus of FIG. 1, with the support platform depicted in a lowered position.
Figure 4D:
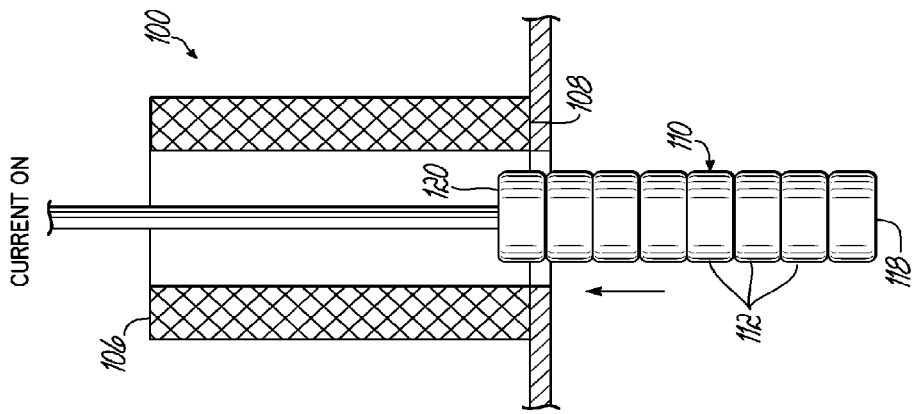
Figure 4E:
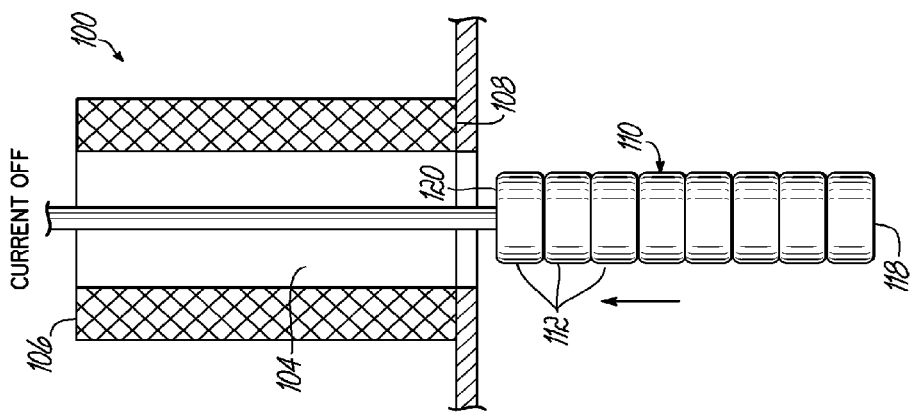
Figure 4F:
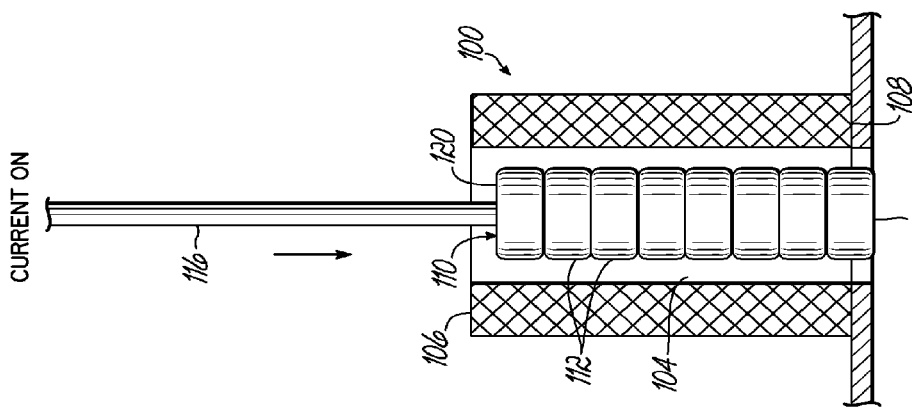
Figure 5:
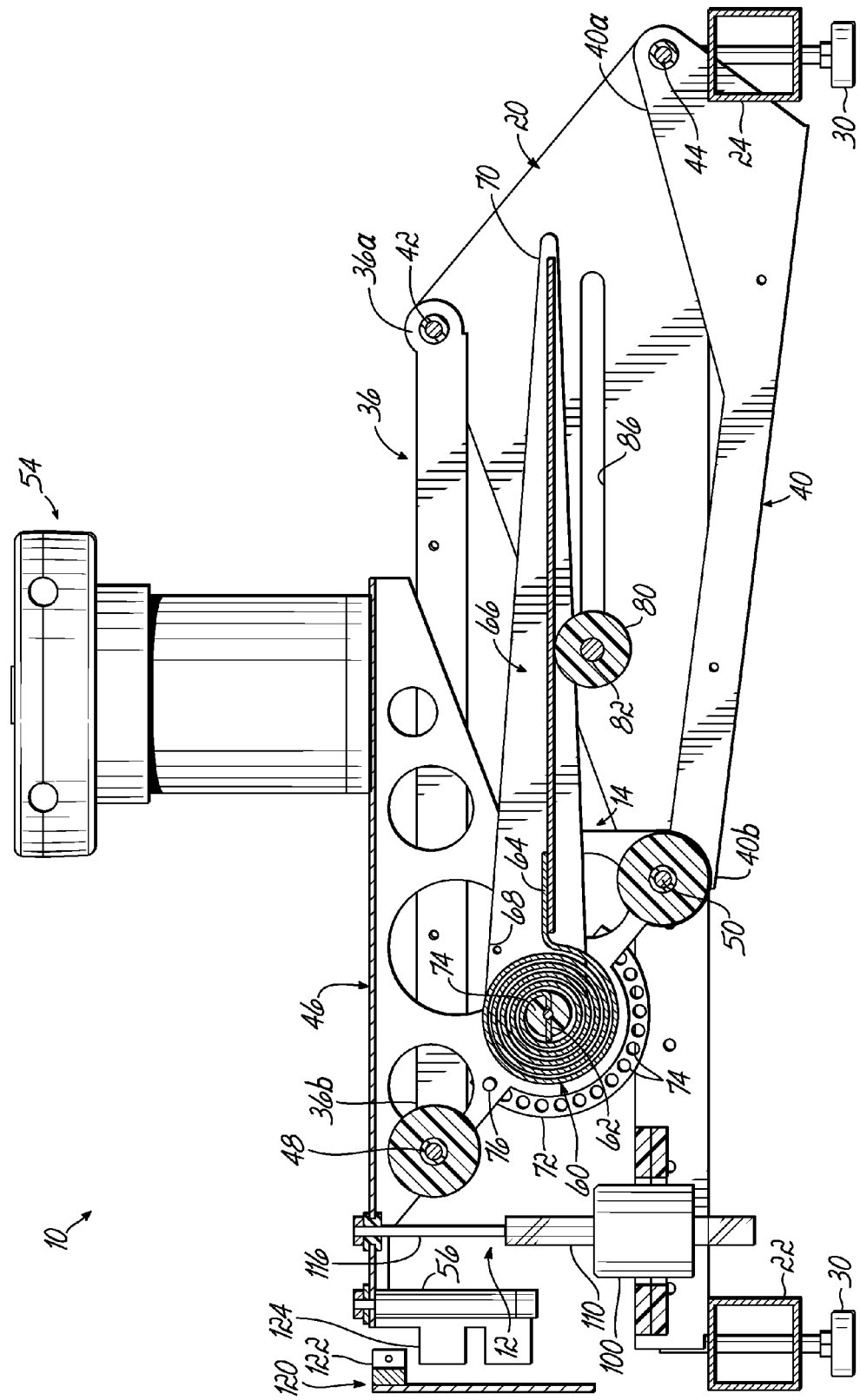
FIG. 5 is a cross-sectional view taken along line 5-5 of FIG. 2.

Referring to FIGS. 1, 2, and 5, the apparatus 10 includes a frame 16 having first and second spaced frame members 18, 20 interconnected by transverse beam members 22, 24. In the embodiment shown, the frame members 18, 20 comprise substantially parallel, vertically-extending sidewalls 26, 28. The frame 16 may include adjustable feet or casters 30 to support the frame 16 above a floor surface, and the frame 16, as well as other components of the apparatus 10 may be enclosed in a housing 32. As shown in FIGS. 3A, 3B, and 3C, housing 32 may comprise a removable upper cover 32a and a lower base portion 32b.

The apparatus 10 further includes a pair of spaced, parallel upper control arms 34, 36 and a pair of spaced, parallel lower control arms 38, 40 (see FIGS. 3C and 5) disposed between the vertically extending sidewalls 26, 28 of the frame 16.

Respective first ends 34a, 36a of the upper control arms 34, 36 and first ends 38a, 40a of the lower control arms 38, 40 are pivotally coupled to the frame 16 by pinned connections 42, 44. The respective second ends 34b, 36b of the upper control arms 34, 36 (see FIGS. 3A and 5) and first ends 38b, 40b of the lower control arms 38, 40 are pivotally coupled to a support platform 46 by pinned connections 48, 50, whereby the upper control arms 34, 36 and lower control arms 38, 40 are movable with the support platform 46 to constrain movement of the support platform 46 in a substantially vertical direction.

A seat mount 52 may be secured to the support platform 46 to facilitate coupling an infant support 54 to the support platform 46, whereby the infant support 54 will be constrained for movement with the support platform 46 in a substantially vertical direction. Travel limiting stops, such as a lower limit bumper 56 (FIG. 5) extending downwardly from support platform 46, and an upper limit bumper (not shown) disposed between the lower control arms 38, 40 and frame members 18, 20, may be provided to control the limits of travel of the support platform 46. While the travel stops are shown and described herein as bumpers, it will be recognized that various other devices and methods may be used to limit the travel of platform 46. While this embodiment is described as being configured to accommodate an infant support 54, it will be recognized that the apparatus may alternatively be used to reciprocate a support for a range of persons, from youths to adults, in a manner similar to that described in co-pending U.S. application Ser. No. 11/257,877, assigned to the assignee of the present invention and hereby incorporated by reference in its entirety.

In the embodiment shown, the frame members 18, 20, the upper control arms 34, 36, lower control arms 38, 40, and support platform 46 are formed from sheet metal that has been stamped or otherwise worked or machined to form the respective components of the apparatus. It will be recognized, however, that various other methods for forming the frame members 18, 20, upper control arms 34, 36, lower control arms 38, 40 and support platform 46 may alternatively be used. For example, and not as limitation, the frame members 18, 20, upper control arms 34, 36, lower control arms 38, 40 and support platform 46 may be formed by molding, casting, machining, or various other methods suitable for fabricating the respective components.

With continued reference to FIGS. 1 and 2, and referring further to FIG. 5, the apparatus 10 may further include a tunable load-offsetting, or counterbalance, mechanism 14 for accommodating varying loads that may be applied to the support platform 46. In the embodiment shown, the counterbalance mechanism 14 comprises a biasing member 60 disposed between the support platform 46 and the frame 16. In this embodiment, the biasing member 60 is a spiral torsion spring having a first end 62 operatively coupled to the support platform 46, and a second end 64 coupled to a spring lever 66 for selectively adjusting the preload, or initial deflection, of the spiral torsion spring 60 to correspond to a given load applied to the support platform 46. The spring lever 66 comprises an elongate member having a first end 68 pivotally coupled to the support platform 46, and a second end 70 cantilevered outwardly from the support platform 46 in a direction between the upper control arms 34, 36, the lower control arms 38, 40, and the vertically extending sidewalls 26, 28 of the frame 16. The second end 70 of the spring lever 66 is biased in a direction toward the lower control arms 38, 40 by the spiral torsion spring 60.

The spiral torsion spring 60 is coupled to the support platform 46 by a pair of semi-circular disks 72 that are pivotally coupled to the support platform 46 by an arbor 74 around which the spiral torsion spring 60 is wound. With the first end 62 of the spiral torsion spring 60 connected to the disks 72, an initial, constant preload of the spiral torsion spring 60 may be selectively adjusted by rotating the disks 72 relative to the support platform 46 and then securing the disks 72 at a desired angular position relative to the support platform 46. In the embodiment shown, a plurality of apertures 74 spaced radially from the arbor are provided around the periphery of the disks 72 and the disks are secured to the support platform 46 by inserting a pin (not shown) through at least one of the apertures 74 and through a corresponding aperture 76 formed in the support platform 46.

The counterbalance mechanism 14 further includes an adjustable pivot, or fulcrum 80, that is selectively positionable along the length of the spring lever 66 to thereby vary a preload of the platform without changing the initial deflection of the spiral torsion spring 60. With the platform deflection substantially constant for all preloads, the system resonant frequency will also remain constant. In the embodiment shown, the fulcrum 80 comprises a roller supported on a shaft 82 extending between the vertical walls 26, 28 of the first and second frame members 18, 20. The shaft 82 is received in corresponding slots 84, 86 formed in the vertical walls 26, 28 of the frame members 18, 20 whereby the roller 80 may be maneuvered to various positions along the spring lever 66 by moving the shaft 82 along the slots 84, 86. To facilitate positioning the shaft 82 and roller 80 at a desired location along the slots 84, 86, pinion gears 88 are provided on the shaft 82 and are rotationally fixed to the shaft 82 at respective ends 90 of the shaft 82 that extend outwardly from the vertical walls 26, 28, as shown in FIG. 2. The pinion gears 88 intermesh with corresponding rack gears 92 provided on the vertical walls 26, 28 of the frame members 18, 20, whereby the position of the shaft 82 and roller 80 may be selected by turning the shaft 82 to cause the pinion gears 88 to move along the rack gears 92 to a desired location. Knobs 94 may be provided on the respective ends 90 of the shaft 82 to facilitate turning the shaft 82 and pinion gears 88.

With the spiral torsion spring 60 connected between the support platform 46 and the spring lever 66, and with the spring lever 66 being pivoted about the arbor 74 of the spiral torsion spring 60, a load applied to the support platform 46 is supported as a sprung mass by the spiral torsion spring 60. Moreover, the static vertical position of the platform 46 and supported load relative to the frame 16 may be selectively adjusted by manipulating the shaft 82 to cause the roller 80 to move along the spring lever 66, as described above. The support platform 46 and load, together with the spiral torsion spring 60, therefore comprise a spring-mass system that exhibits a particular natural frequency. The support platform 46 and supported load may thus be moved upwardly and downwardly, supported on the spiral torsion spring 60, while the upper control arms 34, 36 and lower control arms 38, 40 constrain the upward and downward movement in a substantially vertical direction. The natural frequency of the spring-mass system is related to the static deflection of the supported load upon the spiral torsion spring 60. Accordingly, by adjusting the static vertical height of the support platform 46 relative to the frame 16, using the roller 80 and spring lever 66, the apparatus 10 may be adjusted or tuned to accommodate a range of loads supported on the support platform 46 while maintaining the natural frequency of the spring-mass system. Alternatively, the apparatus 10 may be adjusted with a given load to tune the spring-mass system to a desired natural frequency.

Referring to FIGS. 2, 5, and 4A-4F, in another aspect, the apparatus 10 may include a magnetic drive 12 mounted to the frame 16 and operatively coupled to the support platform 46 to move the support platform 46 upwardly and downwardly in a cyclical fashion. In the embodiment shown, the magnetic drive 12 includes an electric coil 100 comprising conductive wire wound to define a cylindrical barrel 102 having a central bore 104 with oppositely disposed first and second ends 106, 108. A magnetic member 110 is sized to be received within the bore 104 of the electric coil 100 whereby the magnetic member 110 may be moved from a first position outside the bore 104 and spaced from the first end 106 of the bore 104 (see FIG. 4A), through the bore 104, to a second position outside the bore 104 and spaced from the second end 108 of the bore 104 (see FIG. 4E). In the embodiment shown, the magnetic member 110 comprises a stack of individual magnets 112, however, it will be recognized that magnetic member 110 may alternatively comprise a single, unitary magnet. In another embodiment, all components of the drive 12, except the magnetic member 110, comprise non-ferrous materials When electric current is passed through the coil 100, a magnetic field is generated that interacts with the magnetic member 110. Depending upon the direction of current through the coil 100, the magnetic field generated by the coil 100 may attract the magnetic member 110, thereby pulling the magnetic member 110 in a direction into the bore 104, or the generated magnetic field may repel the magnetic member 110, effectively pushing the magnetic member 110 out from the bore 104. When the magnetic member 110 is coupled to a moveable portion of a machine or device, the electric coil 100 can be selectively operated to impart motion to the device. To this end, the drive 12 may include a control 114 (see FIG. 1) operable to selectively provide current to the coil 100 and to selectively change the direction of the current, as needed, to move the magnetic member 110 through the bore 104 and thereby impart corresponding motion to the device.

The magnetic drive 12 is particularly useful when the motion of the device to be moved is cyclical, such as the cyclical reciprocation of the apparatus 10 shown and described herein. In the embodiment shown, the magnetic member 110 is supported on a rod 116 extending downwardly from the support platform 46 and is positioned to be received through the bore 104 of the electric coil 100 as the support platform 46 is reciprocated in a substantially vertical direction as discussed above. In one embodiment, as the magnetic member 110 moves downwardly with the support platform 46 from a raised position (see FIG. 3A) and approaches the first end 106 of the bore 104 (see FIG. 4A), no current flows through the coil 100 and no magnetic forces cooperate with the magnetic field of the magnetic member 110 to induce or hinder motion of the magnetic member 110. As the lower edge 118 of the magnetic member 110 enters the first end 106 bore of the bore 104 (FIG. 4B), current is provided to the coil 100 in a manner that generates a magnetic field that attracts the magnetic member 110, causing the magnetic member 110 to be drawn into the bore 104 through the interaction of the magnetic fields of the magnetic member 110 and the coil 100. The coil 100 remains energized as the magnetic member 110 moves into the bore 104. Just before the lower edge 118 of the magnetic member 110 exits the second end 108 of the bore 104 (FIG. 4C), the coil 100 is de-energized to allow the magnetic member 110 to continue moving in a downward direction without the influence of any magnetic field from the coil 100.

Just after the lower end 118 of the magnetic member 110 exits the second end 108 of the bore 104 (FIG. 4D), the coil 100 is energized with current in a direction to generate a repulsing magnetic field in the coil 100 that pushes the magnetic member 110 further outside of the second end 108 of the bore 104. Just as the upper end 120 of the magnetic member 110 exits the second end 108 of the bore 104, the coil 100 is again de-energized and the magnetic member 110 is allowed to continue moving in a downward direction with no magnetic forces applied by the coil 100. As the magnetic member 110 continues moving in a downward direction, the spiral torsion spring 60 is deflected by the corresponding downward movement of the support platform 46 until the spring force created by deflecting the spiral torsion spring 60 balances and gradually overcomes the downward inertial force of the loaded platform 46, and the platform 46 begins to move in the opposite direction, upwardly away from the ground surface. Now, as the upper end 120 of the magnetic member 110 approaches the second end 108 of the bore 104 (FIG. 4E), no current is flowing through the coil 100 to create magnetic field lines that cooperate with the magnetic field lines of the magnetic member 110. As the upper end 120 of the magnetic member 110 enters the second end 108 of the bore 104 (FIG. 4F), the coil 100 is energized to generate an attractive magnetic force that interacts with the magnetic field of the magnetic member 110 to thereby draw the magnetic member 110 into the bore 104. The magnetic member 110 continues moving in an upward direction. Just prior to the upper end 120 of the magnetic member 110 exiting the first end 106 of the bore 104, the coil 100 is de-energized to permit the magnetic member 110 to move upwardly, unhindered by any magnetic field generated by the coil 100. Just after the upper end 120 of the magnetic member 110 exits the first end 106 of the bore 104, the coil 100 is energized with current flowing in a direction that generates a repulsive force that interacts with the magnetic field of the magnetic member 110, thereby pushing the magnetic member 110 further outside the first end 106 of the bore 104. Just prior to the lower end 118 of the magnetic member 110 exiting the first end 106 of the bore 104, the coil 100 is de-energized so that the magnetic field generated by the coil 100 is ceased. The magnetic member 110 continues to move in an upward direction with the support platform 46 until the forces acting on the support platform 46 due to inertia, gravity, spiral torsion spring 60, and the load carried by the support platform 60 balance out, whereafter the support platform 46 and magnetic member 110 will begin to move downwardly toward the magnetic coil 100. The control 114 continuously cycles current through the magnetic coil 100 in the manner described above and the motion described above is repeated so that the vertical reciprocating motion of the loaded platform 46 is maintained.

The magnetic drive 12 described above is particularly useful when the driven system operates at its natural frequency because a minimum amount of force is needed to be generated by the magnetic drive 12 (to overcome friction losses, for example) whereby the cyclical motion may be maintained with the minimum force applied by the drive 12. In the embodiment shown, the natural frequency of the loaded support platform 46 may be selectively adjusted by manipulating the roller 80 along the spring lever 66. As the support platform 46 moves upwardly and downwardly in a reciprocating fashion at the system's natural frequency the magnetic member 110 will be caused to move into and out of the coil 100 as described above, whereby the magnetic drive 12 will maintain the substantially vertical reciprocating motion.

Energization of the coil 100 can be automatically adjusted by the control 114 to accommodate variations in natural frequency. In the embodiment shown, the magnetic drive 12 includes a sensor 120 (FIGS. 1, 2, and 5) that detects the position of the magnetic member 110 relative to the electric coil 100 and provides signals to the control 114 to energize and de-energize the electric coil 100 in the manner described above. In this embodiment, the sensor 120 comprises an optical position sensor 122 operatively coupled to the frame 16, and a position indicating member 124 coupled to the support platform 46 (see FIG. 5). As the support platform 46 is reciprocated in a substantially vertical direction, the position indicating member 124 is caused to pass by the optical position sensor 122. When the optical position sensor 122 senses the presence of the position indicating member 124, signals are provided to the control 114 and the control 114 responds by energizing and de-energizing the electric coil 100 to operate in the manner described above.

The control 114 may also be configured to automatically turn the apparatus on and off, by selectively energizing and de-energizing the electric coil 100. For example, the control 114 may be configured to discontinue energization of the electric coil 100 after a predetermined period of continuous operation, or alternatively after a continuous period of non-use. The control 114 may also be configured such that energization of the electric coil 100 is ceased if no signal is received from the sensor 120. With such a configuration, the vertical reciprocating motion of the support platform may be stopped simply by holding the platform at a fixed position, either near the uppermost point of travel, or the lowermost point of travel, to thereby prevent the sensor 120 from sending a signal to the control 114. In a similar fashion, the control 114 may be configured to automatically energize the electric coil 100 at the instant the control receives a signal from the sensor 120 after a period of continuous non-use. When the magnetic drive 12 is used with a system that is configured to operate at its resonance frequency, such as the apparatus 10 described above, and the system further includes a control 114 as described above, a minimum amount of power is required to maintain operation of the system. Moreover, power is conserved by the ability of the control 114 to automatically turn the drive 12 on and off as needed. In an exemplary embodiment, an apparatus 10 for reciprocating an infant support 54 may be powered by six D-cell batteries and may operate continuously for more than approximately 120 hours.

While the present invention has been illustrated by the description of an embodiment thereof, and while the embodiment has been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A magnetic drive, comprising:
    an electrically conductive coil defining a bore and having first and second oppositely disposed ends;
    a magnetic member movable from a first position outside said bore and adjacent said first end of said coil, through said bore, to a second position outside said bore and adjacent said second end of said coil;
    a control operable to selectively provide current to said electrically conductive coil and to reverse a direction of the current provided to said electrically conductive coil; and
    a sensor adapted to sense a position of said magnetic member relative to said electrically conductive coil and to generate a signal related to said sensed position;
    said control selectively providing current to said electrically conductive coil, or reversing a direction of the current provided to said coil in response to said signal.

2. The magnetic drive of claim 1, wherein said sensor comprises an optical sensor.

3. A magnetic drive, comprising:
    an electrically conductive coil defining a bore and having first and second oppositely disposed ends;
    a magnetic member movable from a first position outside said bore and adjacent said first end of said coil, through said bore, to a second position outside said bore and adjacent said second end of said coil; and
    a control operable to selectively provide current to said electrically conductive coil and to reverse a direction of the current provided to said electrically conductive coil,
    wherein said magnetic member has a first end and a second end, and wherein said control operates such that:
    current is not provided to said electrically conductive coil when said magnetic member is outside said bore and spaced from said coil;
    current is provided to said coil to attract said magnetic member just before said first end of said magnetic member enters said bore in a first direction;
    current to said coil is ceased just prior to first end of said magnetic member exiting said bore in said first direction;
    current is provided to said coil to repel said magnetic member just after said first end of said magnetic member exits said bore in said first direction;
    current to said coil is ceased just before said second end of said magnetic member exits said bore in said first direction;
    current is provided to said coil to attract said magnetic member just before said second end of said magnetic member enters said bore in a second direction;
    current to said coil is ceased just prior to said second end of said magnetic member exiting said bore in said second direction;
    current is provided to said coil to repel said magnetic member just after said second end of said magnetic member exits said bore in said second direction; and
    current to said coil is ceased just before said first end of said magnetic member exits said bore in said second direction.

* * * * *